UNITED STATES PATENT OFFICE.

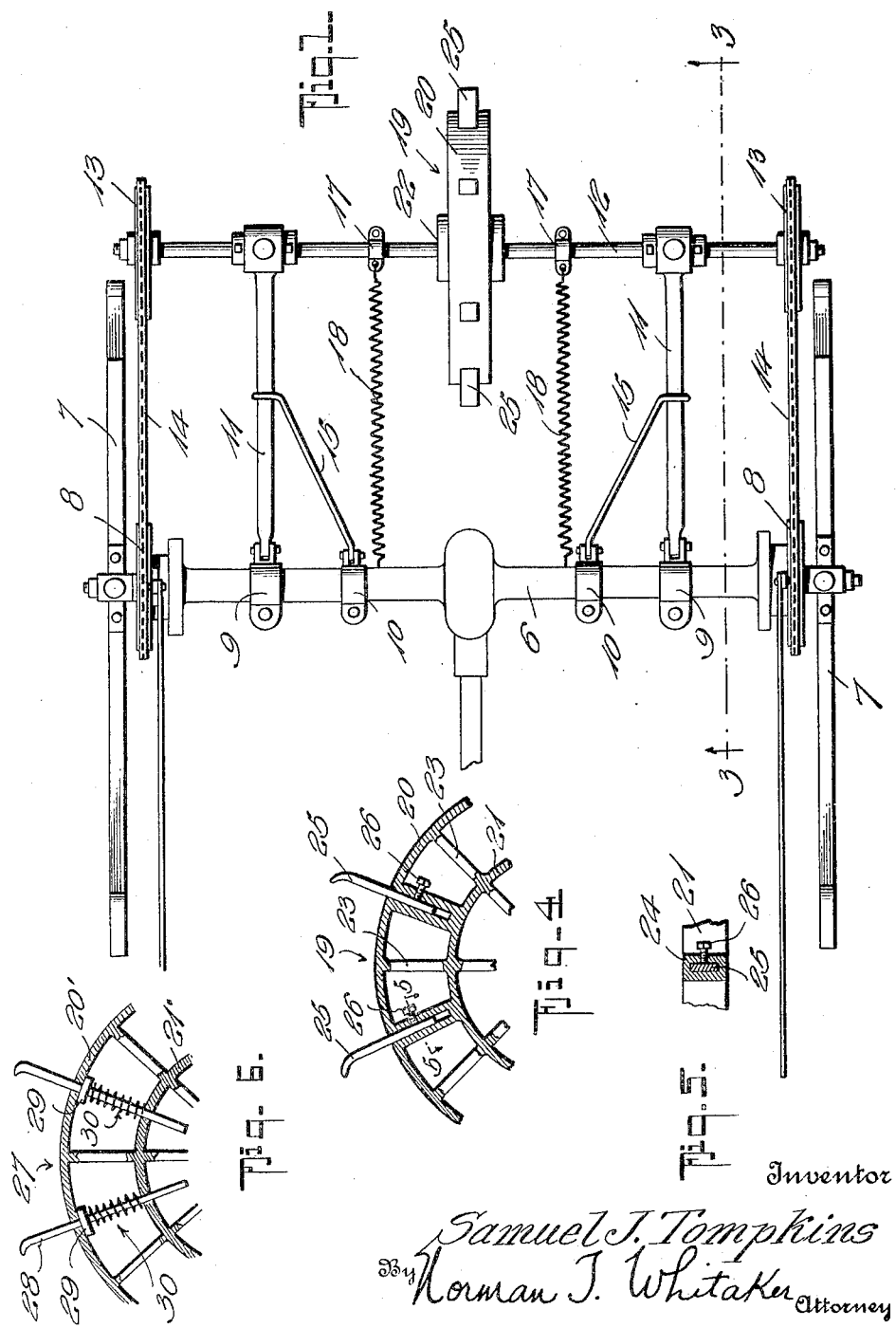

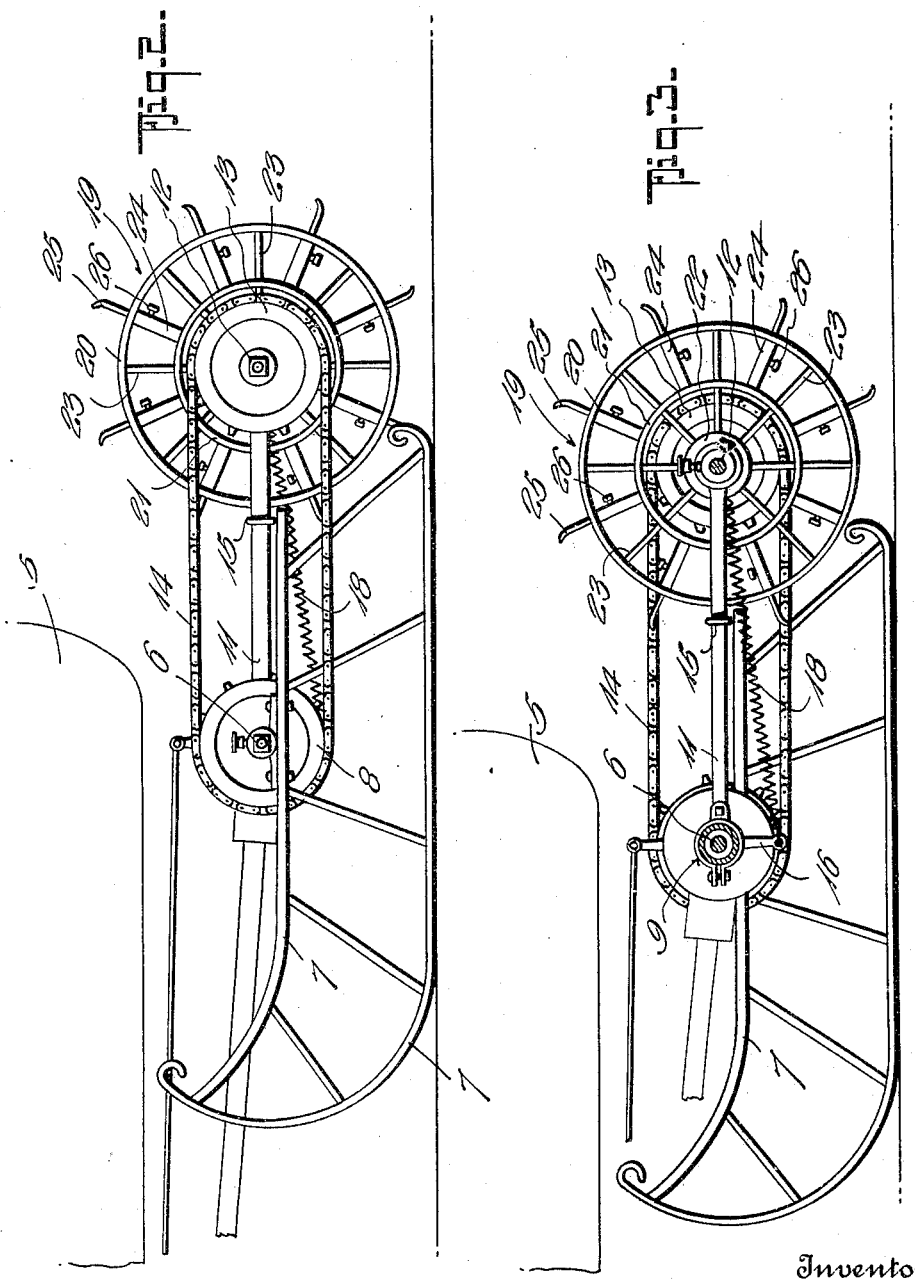

SAMUEL J. TOMPKINS, OF WILLOUGHBY, OHIO.

PROPELLING MECHANISM FOR AUTOMOTIVE SLEIGHS.

1,326,548.  Specification of Letters Patent.  Patented Dec. 30, 1919.

Application filed December 5, 1918. Serial No. 265,442.

*To all whom it may concern:*

Be it known that I, SAMUEL J. TOMPKINS, a citizen of the United States, and a resident of Willoughby, in the county of Lake and State of Ohio, have invented new and useful Improvements in Propelling Mechanism for Automotive Sleighs, of which the following is a specification.

This invention relates to propelling mechanism for automotive sleighs and has particular reference to that class of propelling mechanism adapted to be readily connected with certain elements of an automobile whereby the automobile is converted into an overland vehicle designed to make possible easy and swift traveling over snow or ice covered road-beds or the like.

An important object of the invention is to provide a device of the above mentioned character which may be readily connected with an automobile of the conventional type.

A further object of the invention is to provide a device of the above mentioned character a means whereby certain elements thereof may be retained in contact with the course over which the vehicle is traveling regardless of the irregularity or contour of the same.

A further object of the invention is to provide in a device of the above mentioned character a means whereby certain elements thereof may be adjusted with respect to other coöperating elements in order to obtain an effective and efficient operation of the device as a whole.

A further object of the invention is to provide a device of the above mentioned character which is strong, durable, inexpensive to manufacture and reliable in operation.

Other objects and advantages of the invention will be apparent during the course of the following description taken in connection with the accompanying drawings.

In the drawings, forming a part of this specification and in which like numerals are employed to designate like parts throughout the same, Figure 1 is a top plan view of the device embodying my invention, Fig. 2 is a side elevation of the same, Fig. 3 is a longitudinal sectional view taken on line 3—3 of Fig. 1, Fig. 4 is a detail sectional view of a portion of a traction wheel, Fig. 5 is a transverse sectional view taken on line 5—5 of Fig. 4, and, Fig. 6 is a view showing a modified form of a traction wheel.

In the drawings, attention being called to Figs. 1 to 5 inclusive, wherein is shown a preferred form of my invention, the numeral 5 indicates the body of an automobile having a rear axle 6 supported upon detachable runners 7. In order to use the device embodying my invention the wheels are removed from the axle 6 in order to permit sprockets 8 to be secured thereto, which sprockets are rotated through the same instrumentalities as the traction wheels of an automobile. To the rear axle there is connected a pair of collars 9 substantially near the ends of the axle 6 as shown. In proximity to the collars 9 and relatively near the center of the axle 6 there is arranged a pair of collars 10. To the collars 9 there is pivotally connected a pair of arms 11 within which there is suitably journaled a shaft 12 carrying sprockets 13 at the ends thereof, which sprockets are connected with sprockets 8 by means of sprocket chains 14 in order that rotary movement may be imparted to the shaft 12 from the sprockets 8, which as hereinbefore mentioned are driven or rotated by the instrumentalities employed as a means for transmitting power from the power unit of an automobile to the rear or traction wheels thereof. To the collars 10 there is pivotally connected a pair of brace rods 15 which serve to brace or reinforce the arms 11 against any lateral movement or undue strain which may be exerted thereupon. To the axle 6 there is connected a pair of depending arms 16 which are in turn connected to collars 17 arranged upon the shaft 12 by means of coil springs 18. By means of the coil springs 18 the traction wheel 19 which is secured to the shaft 12 substantially intermediate the ends thereof is retained at all times in contact with the surface of the roadbed over which the vehicle is traveling regardless of any irregularities or depressions which may be formed within the roadbed. The traction wheel 19 comprises a relatively large rim 20 and a relatively small rim 21, which rims are connected to each other and to a hub 22 by means of spokes 23. Between the rims 20 and 21 there are arranged a plurality of sleeves 24 within which are arranged adjustable spikes or gripping elements 25, the gripping elements being held in a desired or given position by means of set screws 26 as clearly shown in Fig. 4.

In considering the modified form of my invention shown in Fig. 6, it will be noted that the traction wheel 27 is substantially identical with that hereinbefore described and indicated by the numeral 19, it differing, however, in that the sleeves 24 are omitted. As a result of the omission of these elements the spikes or gripping element 28 are slidably mounted within the rims 20' and 21'. The spikes or gripping elements 28 are provided with shoulders 29 having engagement with coil springs 30 which encircle the spikes or gripping elements and are confined between the rims 20' and 21' as clearly shown. By this arrangement there is produced a cushioning or yielding effect upon the gripping elements as they successively come into contact with the road-bed over which the motor vehicle is traveling.

In use, the motor vehicle having the device embodying my invention attached thereto is set in motion by applying power to the sprocket wheels 8 in the same manner and through the same instrumentality that power is applied to the rear or traction wheel of an automobile, in which instance the traction wheel 19, if the preferred form of my invention is employed, is caused to rotate, thereby transmitting either forward or backward motion as desired to the vehicle.

It is to be understood that various changes in the shape, size and arrangement of parts may be resorted to without departing from the spirit of my invention or the scope of the subjoined claim.

Having thus described my invention, what I claim as new and desire to secure and protect by Letters Patent of the United States, is:

The combination with the rear axle of an automobile, of a pair of arms pivotally connected thereto, a pair of sprockets carried and driven by said axle, a pair of brace rods connected with said arms and pivotally connected with said axle, a pair of depending arms secured to said axle, a rotatable shaft journaled within said arms, a pair of sprockets carried by said rotatable shaft, said sprockets being secured to said shaft at the ends thereof, a pair of sprocket chains connecting the second named pair of sprockets with the first named pair of sprockets, a traction wheel secured to said shaft, a pair of collars loosely mounted upon said shaft, a pair of springs connecting said depending arm with said loosely mounted collars for normally retaining said traction wheel in engagement with the road-bed.

SAMUEL J. TOMPKINS.